June 12, 1956   D. F. WINTER   2,750,563
TIME JITTER MEASURING SYSTEM
Filed Nov. 29, 1945

INVENTOR
DAVID F. WINTER

BY
ATTORNEY

United States Patent Office 2,750,563
Patented June 12, 1956

2,750,563

TIME JITTER MEASURING SYSTEM

David F. Winter, Cambridge, Mass., assignor, by mesne assignments, to the United States of America as represented by the Secretary of the Navy Application November 29, 1945, Serial No. 631,752

2 Claims. (Cl. 324—68)

This invention relates to the measurement of variations in inter-pulse intervals of a series of voltage pulses, and more particularly, to such measurement in a self-synchronous voltage pulse system.

Generally, small discrepancies in the pulse timing of a radar system can be tolerated, but it is often desirable to ascertain the existence and extent of the variations in inter-pulse intervals, or "time jitter." For example, in a radar system using a spark gap modulator, the exact instant of striking the arc in a rotary spark gap is not easily controllable and the arc may not strike at exactly the same time for each pulse. Therefore, in order to get a true indication of the range of a received echo it is necessary in some modulator work to determine the average time lead or lag in the spark gap striking with relation to a fixed interval of time. In accordance with the present invention, and as is explained more fully hereinafter, the time jitter, lead or lag, in a self-synchronous pulse system is displayed on the screen of a synchroscope, on which the horizontal position of each succeeding pulse depends on where it falls on a sweep that was initiated a fixed time after the preceding pulse.

The general object of this invention is to provide time jitter measurement in a self-synchronous pulse system.

Another object of this invention is to provide time jitter measurement in a self-synchronous pulse system by employing an adjustable gate and a trigger generator to determine the start of the horizontal sweep of a synchroscope upon which succeeding pulses will appear with relation to time.

These and other objects will be apparent from the following specification when taken with the accompanying drawings, in which.

Figure 1:
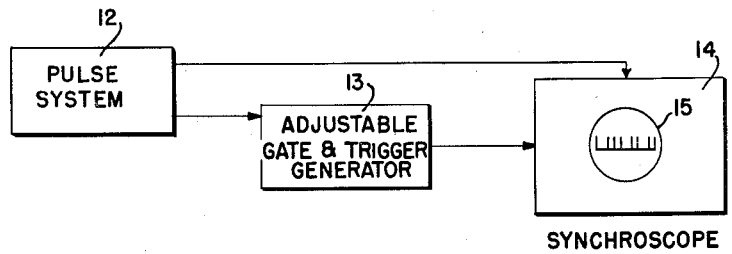
Fig. 1 is a block diagram of an embodiment of the invention.

In Fig. 1, the pulse system 12 feeds its output directly to the vertical deflection element of synchroscope 14 and through an adjustable gate and trigger generator 13 to the sweep for the horizontal element of the synchroscope 14. If the pulses occur at exact intervals, there will be but one pip shown on the screen 15. Adjustments to be hereinafter described can then be made so that a stationary pulse appears in the center of the sweep trace for the recurrence rate of the pulse system under observation.

Figure 2:
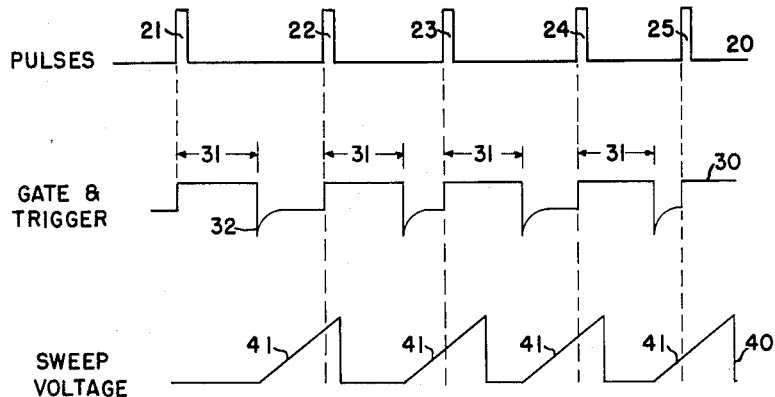
Fig. 2 is a phase diagram of certain voltage wave forms with respect to time.
Figure 3:
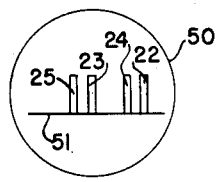
Fig. 3 is a representation of the screen of a synchroscope upon which the pulses will appear as pips along a horizontal sweep of known time duration.

In the phase diagram of Fig. 2, each pulse 21 to 25, inclusive, from the pulse system 12 initiates a fixed gate of length 31, whose trailing edge 32 is a trigger for the horizontal sweep voltage 41 of the synchroscope. Then the next succeeding pulse, 22, 23, 24, or 25, will fall on the sweep at an amplitude of the sweep voltage 41 corresponding to the length of time by which it follows the preceding pulse, and at the same time, start the gate 31 again. As a result, the pulses 21-25 inclusive, shown in Fig. 2 will apper as pips 22-25, inclusive, on the screen 50 as illustrated in Fig. 3 in correspondence to their respective time positions in relation to the preceding pulse. By measuring the overall time spread on a calibrated sweep 51, it is possible to obtain an accurate measure of the time jitter. Some idea as to the number of pulses that occur within certain limits of the mean value can be obtained from the relative brightness of the traces.

To illustrate the foregoing general description, let us assume that the desired time duration between the leading edges of succeeding pulses 21, 22, 23, 24, and 25 of Fig. 2 is 1000 microseconds, but due to the arc, initiating the voltage pulse, not striking at the exact instant in time relationship to the preceding pulse there is a variation in the inter-pulse interval. Let us assume that pulse 21 initiates a gate voltage 31 of 950 microseconds duration, and that the trailing edge 32 of gate voltage 31 triggers a horizontal sweep voltage 41 of 100 microseconds duration. Succeeding pulse 22, if it occurs at the desired time 1000 microseconds after the initiation of pulse 21, should fall at the exact center of the horizontal sweep voltage 41, the gate voltage pulse 31 of 950 microseconds duration plus one half of the sweep voltage pulse duration, or 50 microseconds, being equal to the inter-pulse interval of 1000 microseconds. However, succeeding pulse 22 as illustrated falls approximately at four-fifths of the amplitude of the horizontal sweep voltage therefore, the time interval between pulse 21 and pulse 22 is equal to the gate voltage duration of 950 microseconds plus four-fifths of the sweep voltage duration ($4/5 \times 100 = 80$) or 1030 microseconds.

Each succeeding pulse initiates a gate voltage pulse 31 and triggers a sweep voltage 41 so that the presentation on screen 50 always represents the interpulse-interval of succeeding pulses. Thus, if sweep 51 of Fig. 3 were calibrated in one hundred units the time jitter, whether it be lead or lag, could be read directly from the screen 50 of the synchroscope.

Thus, it is to be clearly understood that the description and illustration of the invention made above has been given only by way of example and not as a limitation on the scope of the invention as set forth in the objects and the accompanying claims.

What is claimed is:

1. A system for measuring the variations in inter-pulse intervals of a series of voltage pulses comprising, a cathode ray tube display means, means responsive to said pulses for initiating the horizontal sweep of said tube at a fixed interval of time following the occurrence of each of said pulses, and means for applying said series of voltage pulses to the vertical deflecting electrodes of said tube.

2. In a system for indicating variations in inter-pulse spacing of a series of pulses, the combination of, a cathode ray tube having horizontal and vertical deflecting electrodes, means for directly connecting said series of pulses to the vertical deflecting electrodes of said tube, means responsive to each pulse in said series for applying a linear sweep voltage to the horizontal deflecting electrodes of said tube, the application of said sweep voltage being delayed after the occurrence of each pulse by a fixed time interval which is less than the period between pulses having the minimum expected spacing, said sweep voltage having a time duration which when added to said fixed time interval exceeds the period between pulses having the maximum expected spacing.

References Cited in the file of this patent

UNITED STATES PATENTS

| | | |
|---|---|---|
| 2,355,363 | Christaldi | Aug. 8, 1944 |
| 2,366,355 | Roberts | Jan. 2, 1945 |
| 2,391,776 | Fredendall | Dec. 25, 1945 |
| 2,422,654 | Bruce | June 24, 1947 |
| 2,422,655 | Hecht | June 24, 1947 |
| 2,449,848 | Hefele | Sept. 21, 1948 |